United States Patent [19]

Bennett et al.

[11] Patent Number: 4,828,316
[45] Date of Patent: May 9, 1989

[54] VEHICLE CURTAIN QUICK RELEASE DEVICE

[75] Inventors: Walter Bennett, San Marino; Terry F. Horton, Whittier, both of Calif.

[73] Assignee: Utility Trailer Manufacturing Company, City of Industry, Calif.

[21] Appl. No.: 50,228

[22] Filed: May 14, 1987

[51] Int. Cl.⁴ .............................................. B60J 5/06
[52] U.S. Cl. ..................... 296/181; 296/183; 160/84.1
[58] Field of Search ............... 296/181, 183; 160/84 R

[56] References Cited
U.S. PATENT DOCUMENTS

| | | | |
|---|---|---|---|
| 3,709,552 | 1/1973 | Broadbent | 296/183 |
| 4,408,793 | 10/1983 | Broadbent | 296/181 |
| 4,545,611 | 10/1985 | Broadbent | 296/183 |
| 4,900,985 | 11/1987 | Whitehead | 296/181 |

Primary Examiner—Robert R. Song
Attorney, Agent, or Firm—Lyon & Lyon

[57] ABSTRACT

A quick release device for tensioning a vehicle curtain and providing easy access to the load in a curtain-sided vehicle. A main tensioning device, usually installed at a front corner of a curtain-sided vehicle is normally used for applying horizontal tension to the curtain. Vertical tensioning straps along the length of the curtain normally provide vertical tension to the curtain as well as load security. At the rear of the curtain-sided vehicle there is a quick-release device so that the rear of the curtain may be held securely in a locked position and then released without first releasing the main tensioning device at the front of the vehicle and all the vertical tensioning straps.

5 Claims, 3 Drawing Sheets

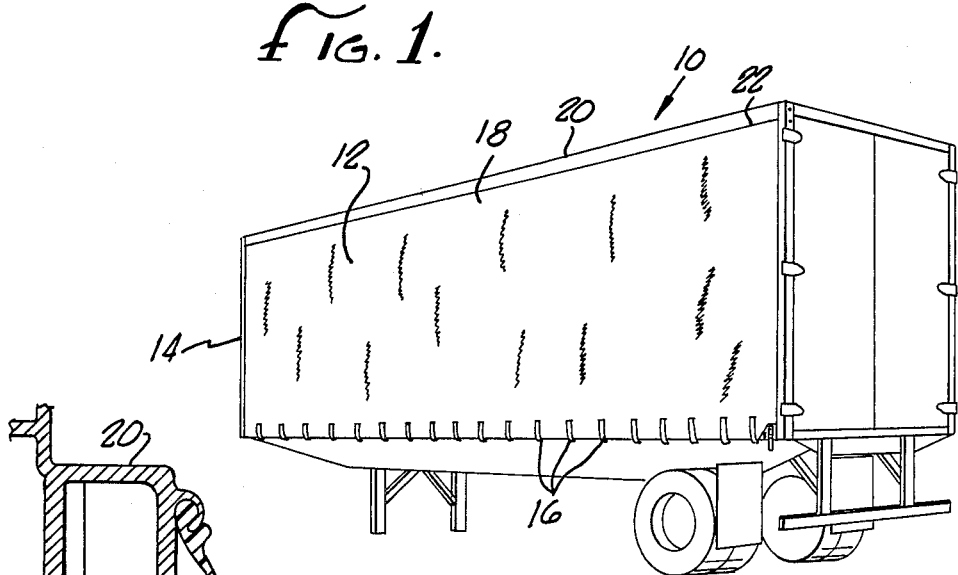
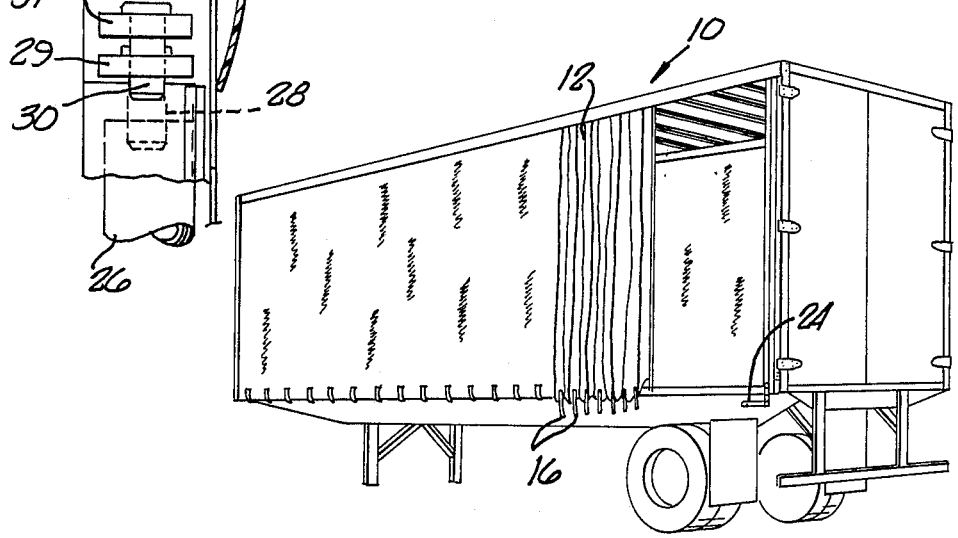

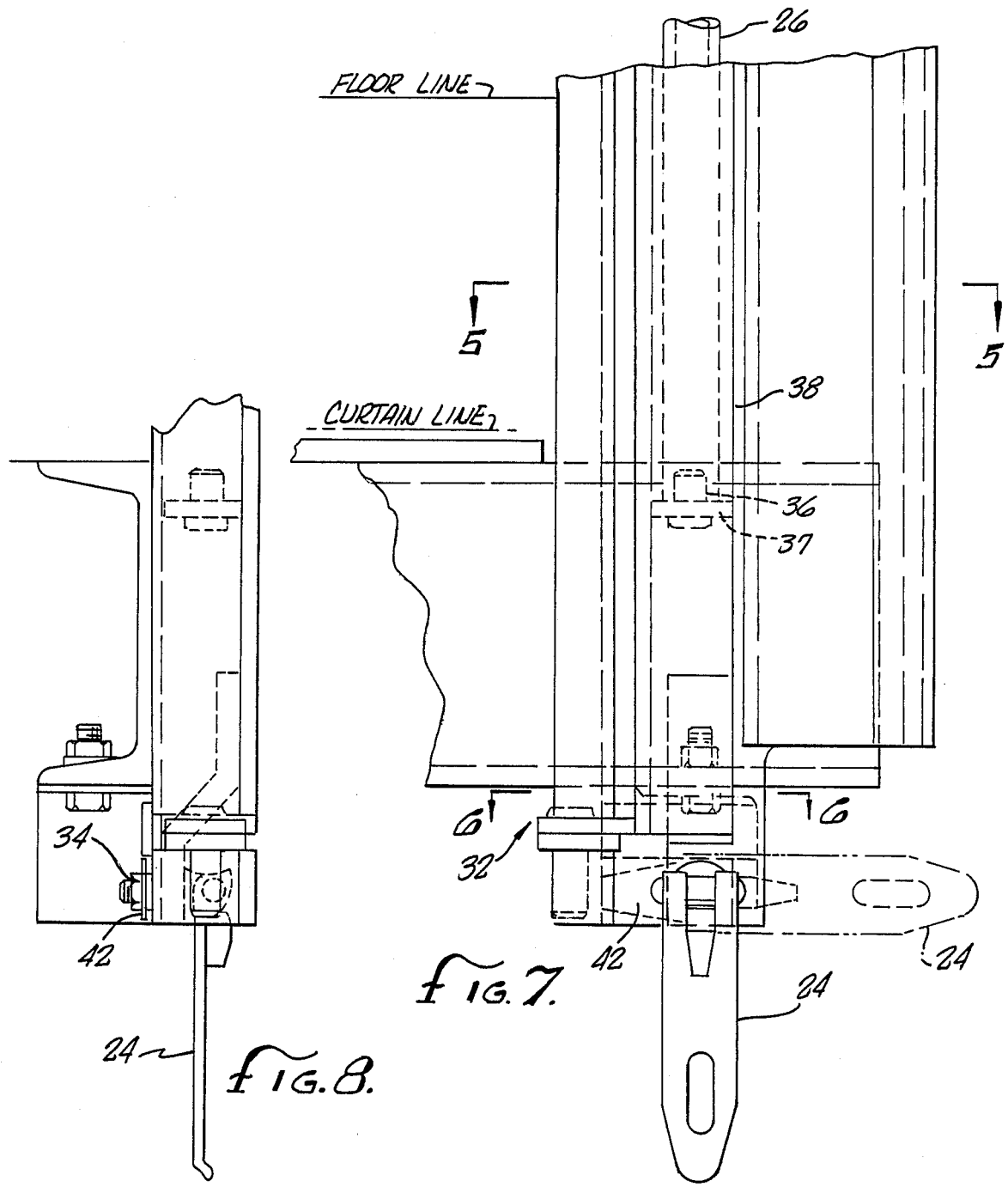
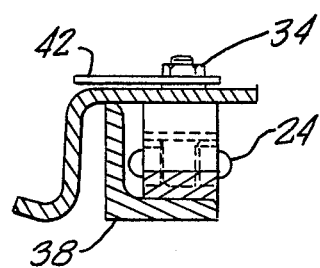
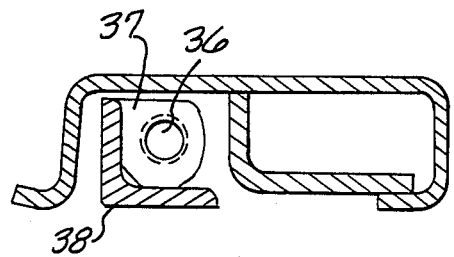

VEHICLE CURTAIN QUICK RELEASE DEVICE

BACKGROUND OF THE INVENTION

This application relates to a curtain-sided vehicle such as described in U.S. Pat. No. 3,709,552. Curtain-sided vehicles combine some of the advantages of a flatbed trailer with those of an enclosed or slab-sided trailer. A flat-bed trailer or truck body offers the advantages of easy cargo accessibility and more efficient loading and unloading. However, to protect a load from weather conditions such as rain and snow, a tarp must be placed over the load and securely tied down. This consumes time and adds to the expense of moving a load. A slab-sided trailer or truck body offers the advantage of weather protection but sacrifices the convenience of side-loading and unloading. Slab-sided vehicles are normally loaded from the rear wherein the front cargo is loaded first and rear cargo is loaded last. Curtain-sided vehicles such as the one described in the '552 patent offer weather protection as well as the convenience of side-loading. In the vehicle disclosed in the '552 patent, a curtain pole is attached to a curtain and then the curtain and pole are secured to the rear of the trailer. The tensioning device at the front of the vehicle is then used to tension the curtain horizontally and a set of vertical straps are secured to the bed of the trailer to provide load security as well as vertical tension. If access to the rear portion of the trailer is necessary, the front tensioning device is released, all the vertical straps are released and the curtain is pulled back at the point where the load is to be accessed. Overall, this procedure is more efficient than the procedure used to load and unload ordinary slab-sided vehicles. However, a considerable amount of time and effort is consumed in accessing a load near the rear of the vehicle since the front tensioning device and vertical straps must be released before the curtain can be released from where it is secured at the rear of the vehicle. Installing a tensioning device at the rear of the trailer, like the one at the front of the trailer, would allow access to the rear portion of the trailer. However this would cause a side-to-side decrease of approximately seven inches in loading width which is unacceptable for some trailer loads.

The manner in which the present invention deals with such problems of the prior art will be understood as this description proceeds.

CROSS REFERENCE TO RELATED APPLICATIONS

The present invention is related to the apparatus disclosed in the application entitled "CURTAIN SIDED VEHICLE APPARATUS" filed concurrently herewith in the names of Walter Bennett and Terry Horton with Ser. No. 07/050,097 and incorporated herein by reference.

SUMMARY OF THE INVENTION

The present invention concerns a quick-release tensioning device which is located at the rear of a curtain-sided trailer or truck body (hereinafter collectively referred to as a "curtain-sided vehicle") which allows more efficient access to loads located toward the rear of a curtain-sided vehicle.

A curtain-sided vehicle such as that described in the '552 patent normally has a tensioning device at the front of the trailer. The present invention adds a quick-release device to the rear of the vehicle which increases efficiency and adds flexibility to the overall vehicle. In the system of the present invention, a tensioning device at the front of the trailer is used to apply tension to the curtain in a horizontal direction. Vertical straps are then secured to the bed of the trailer causing vertical tension to be applied to the curtain.

If it is necessary to access a load near the rear of the trailer, a lever locking a channel in the closed position is rotated to the horizontal position and pulled outwardly to release the channel from the closed position and release tension from the curtain. A curtain pole is removed from the channel and the appropriate vertical tensioning straps are unbuckled. The channel is attached to the trailer at the top and bottom by hinges. The top hinge is lowered to a point just above the lower edge of the pelmet to prevent damage to the pelmet when the channel is in the open position. This provides for quick and easy access to the rear of the trailer without releasing the front tensioning device and all of the vertical straps. After the load has been removed or inserted, the curtain is again secured by simply placing the curtain pole into the channel and moving the channel into its locked position. This replaces the original tension applied by the front tensioning device.

Accordingly, it is an object of the present invention to provide easy and more efficient access to the rear portions of a curtain-sided vehicle without decreasing the full standard door width.

It is another object of the present invention to provide a quick-release mechanism that is easy to operate, that will not damage the pelmet and at the same time securely fastens the curtain to the rear of the vehicle.

Another object of the present invention is to provide a secure curtain pole receptacle that will bear some of the tension applied to the curtain.

A form in which the invention may be effectively and economically constructed will be seen from the following description of a typical embodiment thereof.

BRIEF DESCRIPTION OF THE DRAWINGS

FIG. 1 shows a curtain-sided vehicle with the curtain side closed;

FIG. 2 shows the same curtain-sided vehicle as shown in FIG. 1 with the rear portion of the curtain open;

FIG. 7 is a cut-away view of the lower portion of the channel showing a lower curtain peg and locking lever;

FIG. 8 is a rear view of the locking lever as it is attached to the channel, with the lever shown in the down or locked position;

FIG. 9 is a top cross-section view of the channel in the closed position as shown along the lines 5—5 of FIG. 7;

FIG. 10 is a top cross-section view of the locking lever along lines 6—6 of FIG. 7; and FIG. 11 is a side view of an upper hinge assembly and the pelmet running along the upper edge of the trailer.

DESCRIPTION OF THE PREFERRED EMBODIMENT

Figure 3:
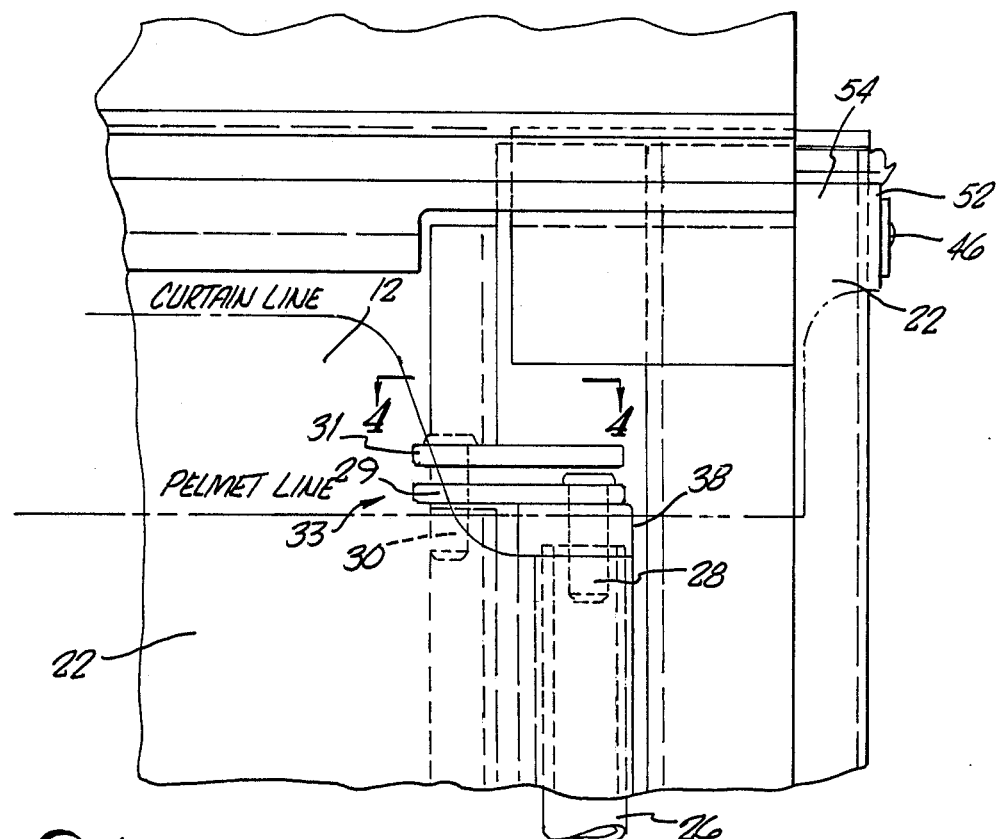
FIG. 3 is a cut-away view of a curtain pole in an upper portion of the channel which is in the closed position.

Referring to FIG. 1, a curtain-sided vehicle 10 is shown with the curtain 12 in the closed position. A horizontal tensioning device (not shown) is located at the front 14 of the vehicle. A plurality of vertical tensioning straps 16 are shown along the lower edge of the curtain 12. At the top 18 of the curtain 12 there are a plurality of rollers (not shown) which are attached to the curtain and which engage a rail 11 (FIG. 11) along the top portion 20 of the vehicle. Attached to the top portion 20 is a pelmet 22 which covers the top of the curtain. At the rear of the vehicle is located a quick-release tensioning device which will be further described with reference to FIGS. 3 through 11.

FIG. 2 shows the curtain-sided vehicle 10, also shown in FIG. 1, with the rear portion of the curtain open. The vertical tensioning straps 16 at the rear of the curtain have been released and curtain 12 has been pushed open. A locking lever 24, which is attached to a quick-release mechanism, is shown in the open position.

With reference to FIGS. 3 and 7, FIG. 3 is a cut-away side view of the upper portion of the quick-release mechanism and curtain pole in the closed position. The channel 38 is attached to rear of the vehicle at an upper hinge assembly 33, (FIG. 3) comprising brackets 29 and 31 and pin 30 and lower hinge assembly 32 (FIG. 7). The channel 38 pivots around the upper and lower hinge assemblies 33 and 32. The curtain pole 26 is shown located within the channel 38. Upper peg 28 and lower peg 36 (FIG. 7) are located in channel 38 for receiving the upper and lower ends of the curtain pole 26. When the curtain pole 26 is inserted in the channel 38, the upper portion of curtain pole 26 is inserted onto the upper peg 28 located in the top of channel 38. The lower portion of the curtain pole 26 is then pushed over the top of the lower peg 36 until it seats over and around the lower peg 36. Upper peg 28 is long enough so that the curtain pole can be pushed up enough onto peg 28 to allow the lower portion of the curtain pole to clear the top edge of lower peg 36 and then seat on peg 36. The curtain pole is secured on upper peg 28 and lower peg 36 when the curtain pole is in the channel 38. When locking lever 24 (FIG. 7) is aligned vertically, it is in the locked position and when it is aligned horizontally, it is in a position to open and close the channel by causing the channel to pivot around the upper and lower hinge assemblies 32 and 33. The locking lever 24 pivots from the vertical to the horizontal position around hinge assembly 34 (FIG. 8).

The upper hinge assembly 33 is mounted behind the curtain and flush with the side of the trailer to allow the pelmet 22 to lay securely against the curtain in the area of the hinge 30 creating a more effective weather seal. The upper section of channel 38 is lowered to a point where rotation of the channel does not stretch the pelmet to the point of damage. This also allows the channel to be more easily opened and closed. The end of pelmet 22 is normally anchored to the truck body by rivets or screws at area 54. When the quick release device is added, the pelmet is attached to rear of the trailer as shown in FIG. 3 at point 52 by bolts or rivets 46. This also allows the channel to be more easily opened and prevents damage to the pelmet 22 caused by overstretching the pelmet when the quick release device is opened.

FIG. 11 is a side view of the upper hinge assembly 33 when the channel 38 is in the closed position. The pelmet 22 is shown resting against the outside surface of the curtain 12.

Figure 6:
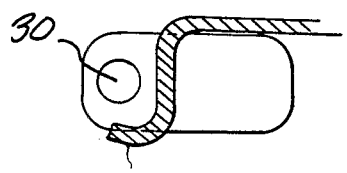
FIG. 6 is a top cross-section along lines 4—4 of FIG. 3 showing a portion of the upper hinge assembly.

FIG. 6 shows a top view of the bracket 31 of the hinge assembly 33 as it is attached to the trailer body. Curtain 12 is shown wrapped around curtain pole 26 in FIG. 5.

Figure 4:
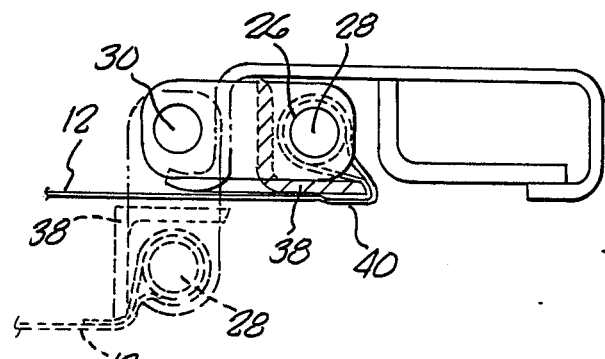
FIG. 4 is a top view of the curtain pole in the channel shown in both the open and closed position.
Figure 5:
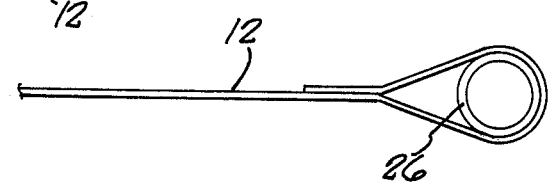
FIG. 5 is a top view of the curtain pole in a curtain pocket.

FIG. 4 shows a top view of the upper portion of the quick-release mechanism in both the open and closed position. In the open position, the channel 38 is shown without cross-hatching. Curtain 12 is shown wrapped around the curtain pole 26 and inserted on the peg 28. The channel 38 is then rotated around the upper and lower hinge assemblies 32 and 33 from the open to the closed position causing the original tension to be reapplied to the curtain. The closed position is shown by the channel 38 with the cross-hatching. When the channel is moved from the open position to the closed position, the curtain 12 rests against channel 38 at point 40.

FIG. 8 is a rear view showing the locking lever 24 in the locked position. After the channel has been moved into the closed position, the locking lever 24 is pivoted around hinge assembly 34 until it is in a vertical position. When locking lever 24 is in the vertical position, it is held in position by latch 42 thereby locking the quick release mechanism in the closed position.

FIG. 9 is a top view along lines 5—5 (FIG. 7) showing the lower peg 36 located in channel 38 and supported by bracket 37.

FIG. 10 is a top view along lines 6—6 showing the locking lever 24 in channel 38. Latch 42 is shown in the locked position. Latch 42 is rotated downward 90° when locking lever 24 is rotated upward 90°. This causes the channel 38 to unlock and release tension on the curtain. Locking lever 24 is approximately 12 inches long so enough force can be applied to the channel 38 to close the channel and reapply the original tension to the curtain.

Modifications and variations in the structure illustrated and described will suggest themselves to those skilled in the art, once the principle of the present invention is understood. Accordingly, it is not intended that the scope of the invention should be considered limited by the drawings or this description, these being illustrative and typical.

What is claimed is:

1. A quick-release mechanism located at one end of a curtain-sided vehicle having a frame including a roof, bed, roof supports and movable curtain comprising:

channel means movable between open and closed positions, first securing means attached to the lower portion of said channel means to accept another end of a curtain pole, second securing means attached to the upper portion of said channel means to accept another end of a curtain pole;

first hinge means attached to the lower portion of said channel means for allowing movement of the channel means between open and closed positions, said first hinge means having a vertically extending hinge axis, second hinge means attached to the upper portion of said channel means for allowing said channel means to move between open and closed positions, said second hinge means having a vertically extending hinge axis, said first and second hinge means attached to the frame of said curtain-sided vehicle at one end of said curtain-sided vehicle and recessed onto the frame and said channel means recessed said frame when in the closed position, flexible pelmet means attached to said roof and extending downward from the roof along the side of said curtain-sided vehicle, and lever means attached to said channel means to move said channel means between the open and closed positions.

2. A quick-release mechanism located at one end of a curtain-sided vehicle having a frame including a bed for supporting cargo, a roof supported above the bed at at least two opposed vertical sides, at least one vertical open side for loading and unloading cargo, a guide rail along the roof at the open side, a plurality of traveling elements engaging the rail and movable there along, a vertical curtain suspended from the traveling elements and movable therewith comprising channel means movable between open and closed positions, securing means attached to said channel means to accept and secure a curtain pole, hinge means attached to said channel means for allowing movement of the channel means between open and closed positions, said hinge means attached to the frame of said curtain-sided vehicle at one end of said curtain-sided vehicle and recessed into the frame, said channel means recessed into the frame when in the closed position and not recessed into said frame in the open position, said hinge means having a vertically extending hinge axis, flexible pelmet means attached to said roof and extending downward from the roof along said vertical open side, and lever means attached to said channel means to move said channel means between the open and closed positions.

3. A quick-release mechanism located at one end of a curtain-sided vehicle having a frame including a roof, roof supports, bed and movable curtain comprising channel means movable between open and closed positions, securing means a part of said channel means to accept and secure a curtain pole, hinge means attached to the channel means for allowing movement of the channel means between the open and closed positions, said hinge means having a vertically extending hinge axis, said hinge means attached to the frame of said curtain-sided vehicle at one end of said curtain-sided vehicle and recessed into said frame, said channel means recessed into said frame when in the closed position and not recessed into said frame in the open position, and lever means attached to said channel means to move said channel between the open and closed positions.

4. A quick release mechanism as in claim 3 including flexible pelmet means attached to said roof and extending downward from the roof along the side of said curtain-sided vehicle, and latching means connected to said channel means for latching the channel means in the closed position.

5. A quick-release mechanism located at one end of a curtain-sided vehicle having a movable curtain comprising:

curtain pole support means movable between open and closed positions, first securing means attached to the lower portion of said curtain pole support means to accept one end of a curtain pole, second securing means attached to the upper portion of said curtain pole support means to accept another end of the curtain pole, hinge means attached to said curtain pole support means for allowing movement of the curtain pole support means between open and closed positions, said hinge means having a vertically extending hinge axis, said hinge means being attached to the curtain-sided vehicle at one end and recessed into a side of the curtain-sided vehicle, said pole support means recessed into said side of the curtain-sided vehicle when in the closed position and not recessed into said side of the curtain-sided vehicle when in the open position, and means on said curtain pole support means to move same between the open and closed positions and to apply tension to said movable curtain in the closed position and release tension from said movable curtain in the open position.

* * * * *